(12) United States Patent
Heydinger

(10) Patent No.: US 7,497,538 B2
(45) Date of Patent: Mar. 3, 2009

(54) METHOD OF MULTIPASS PRINTING USING A PLURALITY OF HALFTONE PATTERNS OF DOTS

(75) Inventor: Scott Michael Heydinger, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 11/463,117

(22) Filed: Aug. 8, 2006

(65) Prior Publication Data

US 2008/0036811 A1 Feb. 14, 2008

(51) Int. Cl.
*B41J 2/205* (2006.01)

(52) U.S. Cl. .......................... 347/15; 358/1.2; 358/1.9; 347/41

(58) Field of Classification Search ................... 347/12, 347/40, 15, 43, 41; 358/1.2, 1.9, 3.01, 3.06
See application file for complete search history.

(56) References Cited

U.S. PATENT DOCUMENTS 5,604,520 A * 2/1997 Matsubara et al. ............ 347/43
7,168,784 B2 * 1/2007 Donovan et al. .............. 347/41

* cited by examiner

*Primary Examiner*—Lamson D Nguyen
(74) *Attorney, Agent, or Firm*—Taylor & Aust, PC

(57) ABSTRACT

A method of printing dots in an area on a page using a plurality of printing passes of a printhead over the area, includes processing continuous tone data representing an image through N halftoning iterations to generate N halftone patterns of dots for the area; and printing each individual halftone pattern of the N halftone patterns during the plurality of printing passes, with each individual halftone pattern of the N halftone patterns being printed on a different printing pass of the plurality of printing passes over the area.

13 Claims, 6 Drawing Sheets

METHOD OF MULTIPASS PRINTING USING A PLURALITY OF HALFTONE PATTERNS OF DOTS

FIELD OF THE INVENTION

The present invention relates to printing, and, more particularly, to a method of printing using a plurality of halftone patterns of dots.

BACKGROUND OF THE INVENTION

Ink jet printing systems produce images by printing patterns of dots on a sheet of print media, such as paper. Such systems typically include two main mechanisms for determining the location of dots on the page, namely, a halftone mechanism and a shingling mechanism. Such mechanisms may be implemented, for example, in software, firmware, hardware, or a combination thereof, and may reference one or more lookup tables.

The halftone mechanism compensates for the inability of an ink jet printer, i.e., a binary printer, to print a continuous range of tones. For example, a binary printer can only produce colors by either printing or not printing a dot of ink, which at first glance would suggest only two shades can be printed. However, by printing patterns of various percentages of ink in a given area between zero percent and 100 percent ink, in effect many shades can be produced. Thus, halftoning involves the eventual pattern of dots placed on a page as a result of the printing process and the halftone pattern is visible to the user after the page is completely rendered.

One commonly used halftone algorithm utilized in ink jet printing is error diffusion. In summary, error diffusion operates on a pixel by pixel basis by first comparing the 0 to 255 value from the color conversion against a threshold, nominally 127. If greater, a drop is printed (actual=255). If less, no drop is printed (actual=0). The difference between the actual value printed and the desired value from the color conversion is computed as an error. The error is then spread to neighboring values to compensate for overprinting or underprinting at the present position. Since error is distributed to neighbors instead of discarded, the correct number of drops will be placed on the page on average. In error diffusion, the dots are maximally dispersed, i.e., there are no clumps of dots and consequently no void white areas. Large areas of dot clumps or voids are more visible to the human eye than the dispersed patterns produced by error diffusion.

Once the halftone mechanism has decided where the dots of ink are to be placed on the page, the shingling mechanism decides on which pass of a plurality of passes of the ink jet printhead over a given print area that particular dots of ink are to be deposited. Whereas it may be possible to print all of the dots on a single pass over a given area, in general multiple passes are used to hide horizontal bands. It is the function of the shingling mechanism to deposit all of the dots once, and only once, in the positions determined by the halftone algorithm.

According to conventional 2-pass shingling, for example, wherein the variable N represents the number of printing passes, on a single pass of the printhead $1/N=\frac{1}{2}=50\%$ of the dots are printed, commonly using a "checkerboard" pattern, which is defined by a shingling mask. The shingling mask determines for a given area the pixel locations within that area that may receive a dot of ink in a particular printing pass, and the pixel locations that will not receive a dot of ink on that particular printing pass. Between passes, the paper is moved with respect to the printhead by a distance equal to $1/N=\frac{1}{2}=50\%$ of the height of the printhead. Additionally, between passes of the printhead the shingling pattern is changed from one phase of the checkerboard shingling mask to the complementary phase of the checkerboard shingling mask. By advancing the paper and changing the shingle mask phases, all of the dots at each of the pixel positions in the checkerboard pattern have one and only one chance to be printed.

While shingling at N=2 was used in the example described above, it is also known to perform shingling where the number of passes is greater than 2, e.g., where N=3, 4, 6, 8 and 16. The ideas are the same as for N=2 pass shingling in that a fraction of approximately 1/N of the dots requested by the halftone to eventually be deposited is placed on each pass, and the paper is advanced by about 1/N of the fractional height of the printhead. Additionally, the shingling pattern of each level of a shingle mask is extended beyond that of a checkerboard to a different, but typically small, repeating pattern.

It is common in inkjet printing that the N passes of shingling are not typically properly aligned with respect to one another, for a variety of reasons. For example, although the paper should advance by 1/N of the height of the printhead between successive passes, typically the paper advances either a little more (overfeed) or a little less (underfeed) than requested. Further, the amount of overfeed or underfeed may vary from pass to pass, and is typically worse at the bottom of the printed page as the paper has exited the rollers that primarily govern its movement. As an additional example, two subsequent passes are commonly printed in different directions which results in misalignment due to the difference in flight dynamics of drops as they travel between the nozzle ejector and the paper when printed in opposite directions.

Thus, although the pattern of dots requested by error diffusion halftoning might have the desired visual properties of a dot pattern, a sample of such a pattern taken according to the prior art shingle mask techniques may not posses the desired visual properties on the printed page. In other words, when the multiple passes are printed with placement error between the passes (overfeed/underfeed, or bidirectional misalignment) the overall pattern on paper is adversely impacted.

What is needed in the art is a method that produces patterns of dots on paper that have visually desirable properties whether or not the multiple passes are properly aligned.

SUMMARY OF THE INVENTION

The present invention relates to a method of printing using a plurality of halftone patterns of dots.

The invention, in one form thereof, is directed to a method of printing dots in an area on a page using a plurality of printing passes of a printhead over the area. The method includes processing continuous tone data representing an image through N halftoning iterations to generate N halftone patterns of dots for the area; and printing each individual halftone pattern of the N halftone patterns during the plurality of printing passes, with each halftone pattern of the N halftone patterns being printed on a different printing pass of the plurality of printing passes over the area.

The invention, in another form thereof, is directed to an apparatus for printing dots in an area on a page using a plurality of printing passes of a printhead over the area. The apparatus includes a print engine for carrying the printhead. A halftoner mechanism receives continuous tone data representing an image and processes the continuous tone data through N halftoning iterations to generate N halftone patterns of dots for the area. A formatter mechanism is communicatively coupled between the halftoner mechanism and the print engine. The formatter mechanism is configured to supply each of the N halftone patterns individually to the print engine, and each halftone pattern of the N halftone patterns is printed on a different printing pass of the plurality of printing passes in the area.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DESCRIPTION OF THE PREFERRED EMBODIMENT

Figure 1:
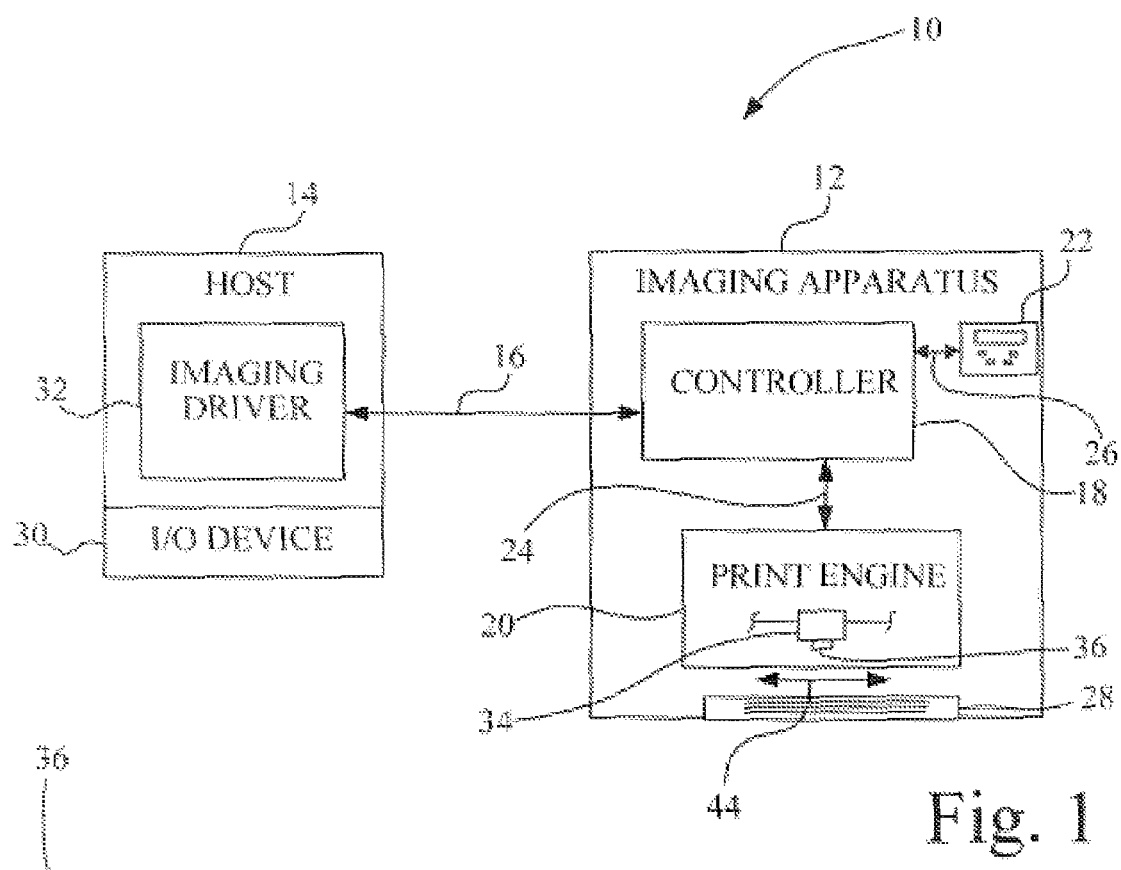
FIG. 1 is a diagrammatic representation of a system employing an embodiment of the present invention.

There is shown FIG. 1 a diagrammatic depiction of a system 10 embodying the present invention. System 10 may include an imaging apparatus 12 and a host 14, with imaging apparatus 12 communicating with host 14 via a communications link 16. Alternatively, imaging apparatus 12 may be a standalone unit that is not communicatively linked to a host, such as host 14. For example, imaging apparatus 12 may take the form of a multifunction machine that includes standalone copying and facsimile capabilities, in addition to optionally serving as a printer when attached to a host, such as host 14.

Imaging apparatus 12 may be, for example, am ink jet printer and/or copier. Imaging apparatus 12 includes a controller 18, a print engine 20 and a user interface 22.

Controller 18 includes a processor unit and associated memory, and may be formed as an Application Specific Integrated Circuit (ASIC). Controller 18 communicates with print engine 20 via a communications link 24. Controller 18 communicates with user interface 22 via a communications link 26.

In the context of the examples for imaging apparatus 12 given above, print engine 20 may be, for example, an ink jet print engine configured for forming an image on a page 28, e.g., a sheet of print media, such as a sheet of paper, transparency or fabric.

Host 14 may be, for example, a personal computer including an input/output (I/O) device 30, such as keyboard and display monitor. Host 14 further includes a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 32, e.g., printer driver software, for imaging apparatus 12. Imaging driver 32 is in communication with controller 18 of imaging apparatus 12 via communications link 16, Imaging driver 32 facilitates communication between imaging apparatus 12 and host 14, and may provide formatted print data to imaging apparatus 12, and more particulary, to print engine 20.

Alternatively, however, all or portion of imaging driver 32 may be located in controller 18 of imaging apparatus 12. For example, where imaging apparatus 12 is a multifunction machine having standalone capabilities, controller 18 of imaging apparatus 12 may include an imaging driver configured to support a copying function, and/or a fax-print function, and may be further configured to support a printer function. In this embodiment, the imaging driver facilitates communication of formatted print data to print engine 20.

Communications link 16 may be established by a direct cable connection, wireless connection or by a network connection such as for example an Ethernet local area network (LAN). Communications links 24 and 26 may be established, for example, by using standard electrical cabling or bus structures, or by wireless connection.

Print engine 20 may include, for example, a reciprocating printhead carrier 34 that carries at least one ink jet printhead 36, and may be mechanically and electrically configured to mount, carry and facilitate multiple cartridges, such as a monochrome printhead cartridge and/or one or more color printhead cartridges, each of which includes a respective printhead 36. For example, in systems using cyan, magenta, yellow and black inks, printhead carrier 34 may carry four printheads, one printhead for each of cyan, magenta, yellow and black. As a further example, a single printhead, such as printhead 36, may include multiple ink jetting arrays, with each array associated with one color of a plurality of colors of ink. In such a printhead, for example, printhead 36 may be include cyan, magenta, and yellow nozzle arrays for respectively ejecting full strength cyan (C) ink, full strength magenta (M) ink and yellow (Y) ink. Further, printhead 36 may include dilute colors, such as dilute cyan (c), dilute magenta (m), etc. The term, dilute, is used fore convenienece to refer to an ink that is lighter than a corresponding full strength ink of substantially the same hue, and thus, such dilute inks may be, for example, either dye based or pigment based.

Figure 2:
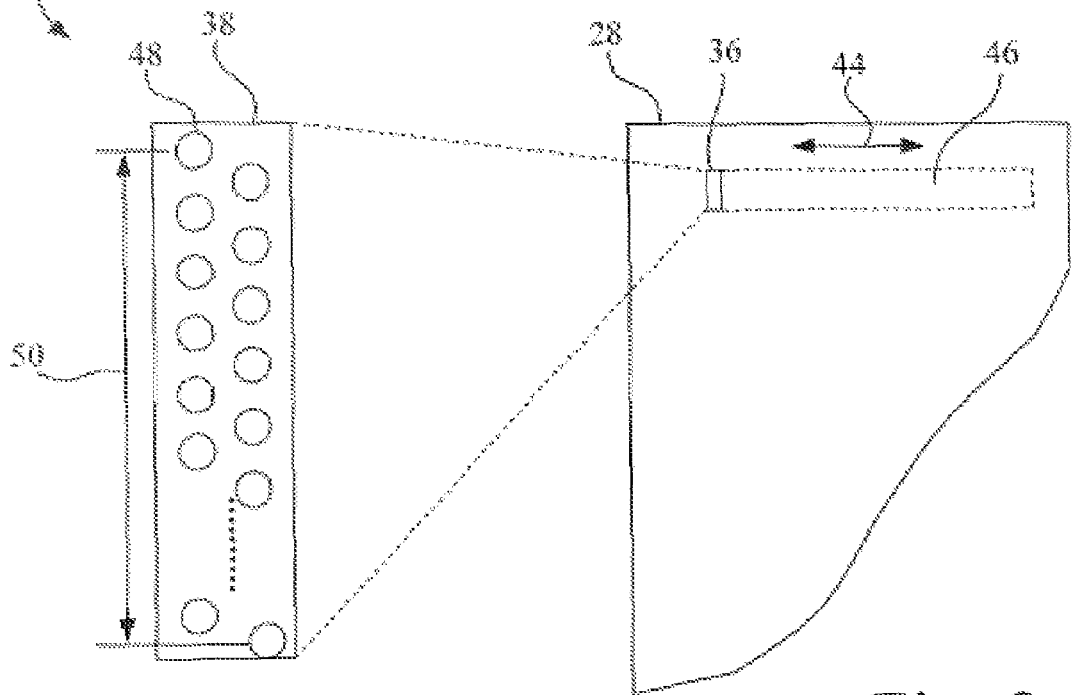
FIG. 2 is a diagrammatic representation of a printhead defining a swath on a page.

FIG. 2 illustrates an exemplary nozzle configuration of printhead 36, inclding a monochrome nozzle array 38 for ease of discussion. Printhead carrier 34 is controlled by controller 18 to move printhead 36 in a reciprocating manner along a bi-directional scan path 44, which will also be referred to herein as horizontal direction 44. Each left to right, or right to left movement of printhead carrier 34 along bi-directional scan path 44 over page 28 will be referred to herein as a pass. The region traced by printhead 36 over page 28 for a given pass is referred to herein as a swath, such as for example, swath 46 as shown in FIG. 2.

In the exemplary nozzle configuration for ink jet printhead 36 shown in FIG. 2, nozzle array 38 includes a plurality of ink jetting nozzles 48. As within a particular nozzle array, the nozzle size may be, but need not be, the same size. A swath height 50 of swath 46 corresponds to the distance between the uppermost and lowermost of the nozzles of printhead 36.

Those skilled in the art will recognize that the discussion above with respect to FIG. 2 regarding a monochrome nozzle array 38 may be easily applied to a color printing, e.g., where printhead 36 is a color printhead including multiple arrays representing a plurality of primary full strength colors and/or dilute colors of ink.

Figure 3:
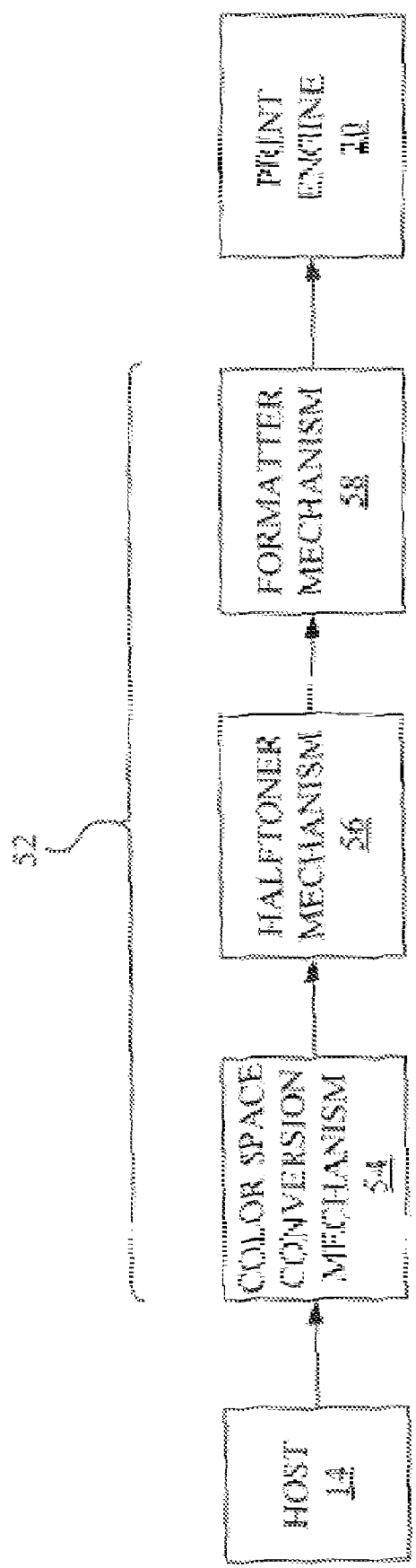
FIG. 3 is a block diagram of an embodiment of a data conversion mechanism that may be utilized in the imaging system of FIG. 1.

Referring to FIG. 3, in order for print data from host 14 to be properly printed by print engine 20, the rgb data generated by host 14, for example, is converted into data compatible with print engine 20 and printhead 36. In this regard, an exemplary data conversion mechanism 52 is used to convert rgb data, generated for example by host 14, into data compatible with print engine 20 and printhead 36.

Data conversion mechanism 52 may be located in imaging driver 32 of host 14, in controller 18 of imaging apparatus 12, or a portion of data conversion mechanism 52 may be located in each of imaging driver 32 and controller 18. Data conversion mechanism 52 includes a color space conversion mechanism 54, a halftoner mechanism 56, and a formatter mechanism 58. Each of color space conversion mechanism 54, halftoner mechanism 56, and formatter mechanism 58 may be implemented in software, firmware, hardware, or a combination thereof, and may be in the form of program instructions and associated data arrays and/or lookup tables.

In general, color space conversion mechanism 54 takes signals form one color space domain and converts them into signals of another color space domain for each image generation. As is well known in the art, color conversion takes place to convert from a light-generating color space domain of, for example, a color display monitor that utilizes primary colors red (r), green (g) and blue (b) to a light-reflective color space domain of, for example, a color printer that utilizes colors, such as for example, cyan (C, c) magenta (M, m), yellow (Y) and black (K).

In the example of FIG. 3, rgb data, such as the output from an application executed on host 14, is supplied to color space conversion mechanism 54 to generate contiinuous tone data. The continuous tone data representing the image to be printed is then processed by halftoner mechanism 56 using a halftoning algorithm, such as an error diffusion halftoning algorithm, in a manner in accordance with the present invention to generate N halftone patterns of 1/N fractions of the total number of dots needed to represent the image to be printed. In the present example, N is the number of printing passes that printhead 36 will pass over each pixel location in a given area on page 28. In other words, the combination of the N halftone patterns, with each halftone pattern being printed on a separate printing pass, represent the eventual pattern of dots to be placed on page 28 as a result of the printing process.

Accordingly, the present invention does not perform a separate shingling process in formatter mechanism 58 on the entire halftoner image data, as would be done in the prior art. Rather, with the present invention, it is halftoner mechanism 56 that decides on which pass of a plurality of printing passes of the ink jet printhead 36 over a given print area that particular dots of ink are to be deposited on page 28. In other words, a different halftone pattern is generated for each pass of a multi-pass printing operation to complete printing of a particular printing area on the printed page. The printing area includes a plurality of substantially horizontal printing lines, as is known in the art, and one pattern of the N halftone patterns, representing only a portion of the dot positions on a particular line, are deposited in the printing area on a particular printing pass.

Halftoner mechanism 56 and formatter mechanism 58 are independent mechanisms, whereby halftoner mechanism 56 decides where the final pattern of dots resides on the paper, e.g., page 28, and determines the intermediate halftone patterns of dots for individual printing passes. Formatter mechanism 58 outputs each of the intermediate halftone patterns of dots to print engine 20 for printing on separate printing passes over a given area on page 28, with each pixel location, i.e., a potential dot location, in the given area being traced by printhead 36 a number of times corresponding to the number of printing passes.

Figure 4:
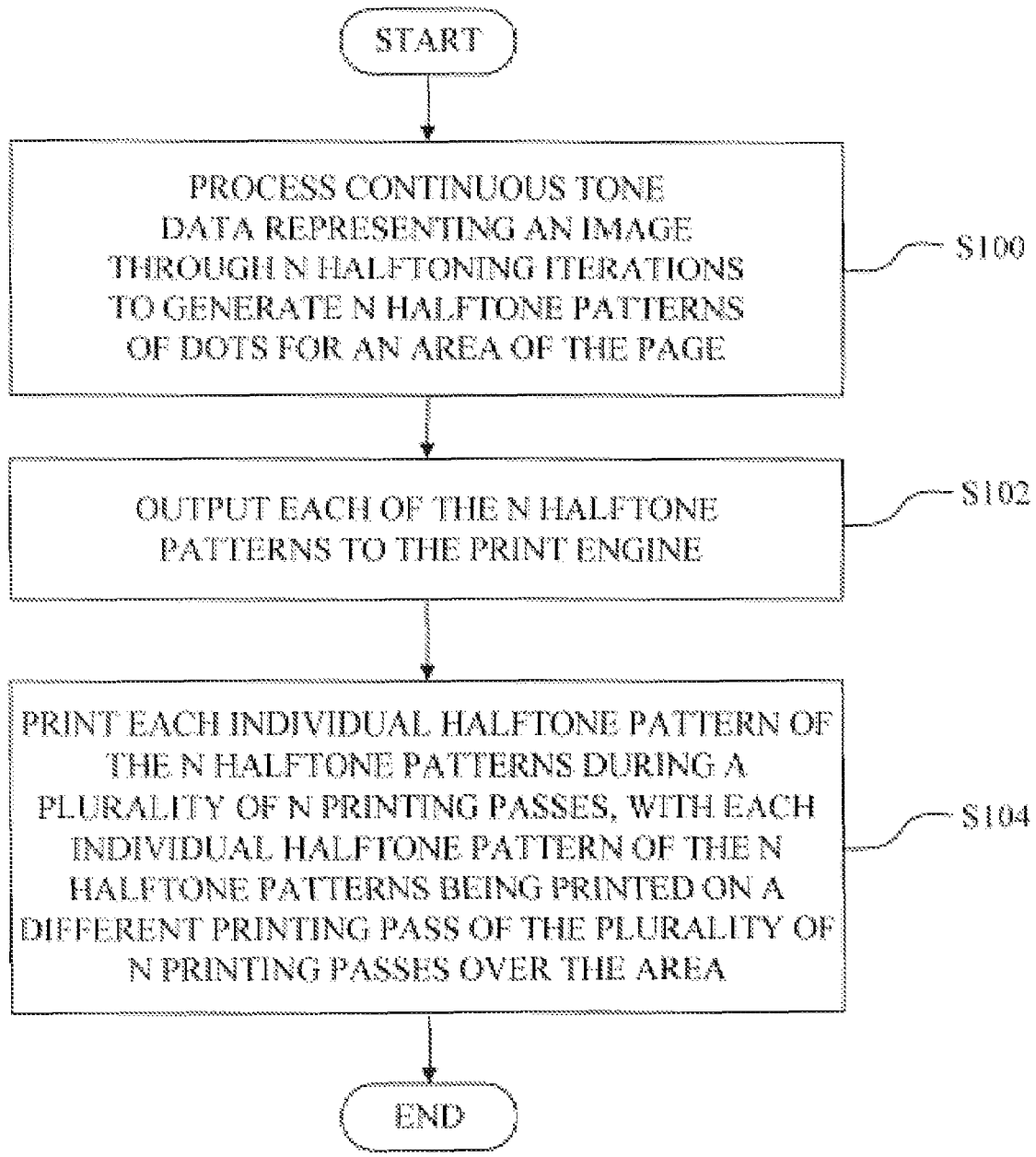
FIG. 4 is a flow chart of a general method of printing in accordance with the present invention.

FIG. 4 is a flow chart of a general method of printing dots in an area on a page using a plurality of printing passes of a printhead over the area, in accordance with an embodiment of the present invention.

Figure 5:
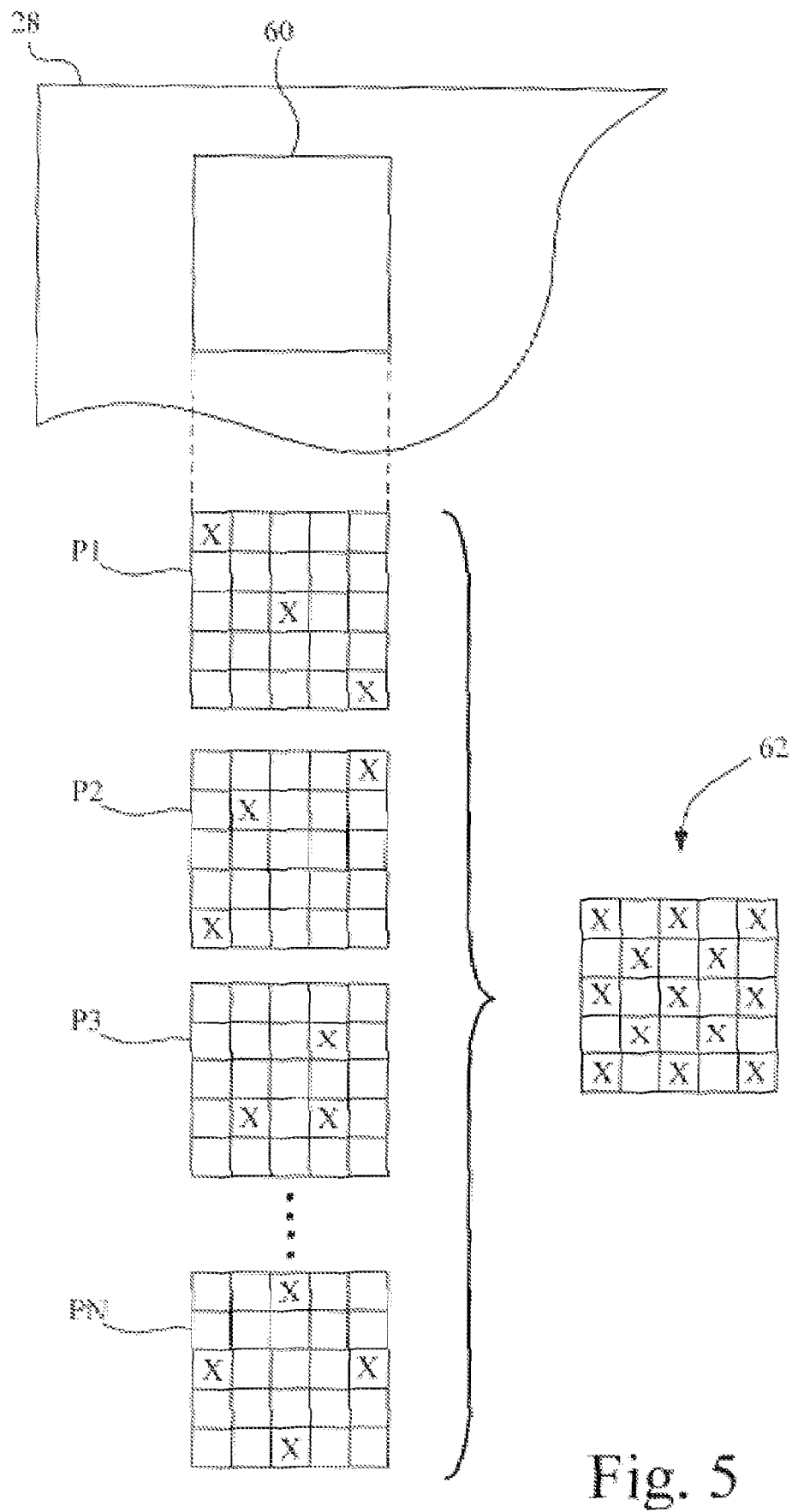
FIG. 5 illustrates an area in a page to be printed using multiple halftone patterns on respective multiple printing passes.

At step S100, continuous tone data representing an image is processed through N halftoning iterations performed by halftoner mechanism 56 to generate N halftone patterns of dots P1, P2, P3, . . . PN for an area 60 of page 28, as illustrated by example in FIG. 5. In the illustrative example of FIG. 5, in each of the N halftone patterns P1, P2, P3, . . . PN, an "X" represents a dot location to be printed. The combination of halftone of dots P1, P2, P3, . . . PN, is illustrated by pattern 62, and represents the halftone coverage pattern for area 60. In the present embodiment, an error diffusion halftone algorithm is used to generate the N halftone patterns P1, P2, P3, . . . PN.

At step S102, the formatter mechanism 58 outputs each of the N halftone patterns to print engine 20. More particularly, for the given area 60, formatter mechanism 58, which is communicatively coupled between halftoner mechanism 56 and print engine 20, is configured to supply each of the N halftone patterns individually to printed engine 20 for printing on separate printing passes of printhead 36 over area 60. As is known in the art, a paper advance of page 28 may occur between the printing of each of the N halftone patterns.

At step S104, each individual halftone pattern of the N halftone patterns P1, P2, P3, . . . PN is printed by print engine 20 during the plurality of N printing passes, with each individual halftone pattern of the N halftone patterns being printed on a difference printing pass of the plurality of N printing passes over the area. For example, the first halftone pattern P1 of the N halftone patterns is printed on a first printing pass over the area 60, the second halftone pattern P2 of the N halftone patterns is printed on second printing pass over the area 60, the third halftone pattern P3 of the N halftone patterns is printed on third printing pass over the area 60, etc.

Figure 6:
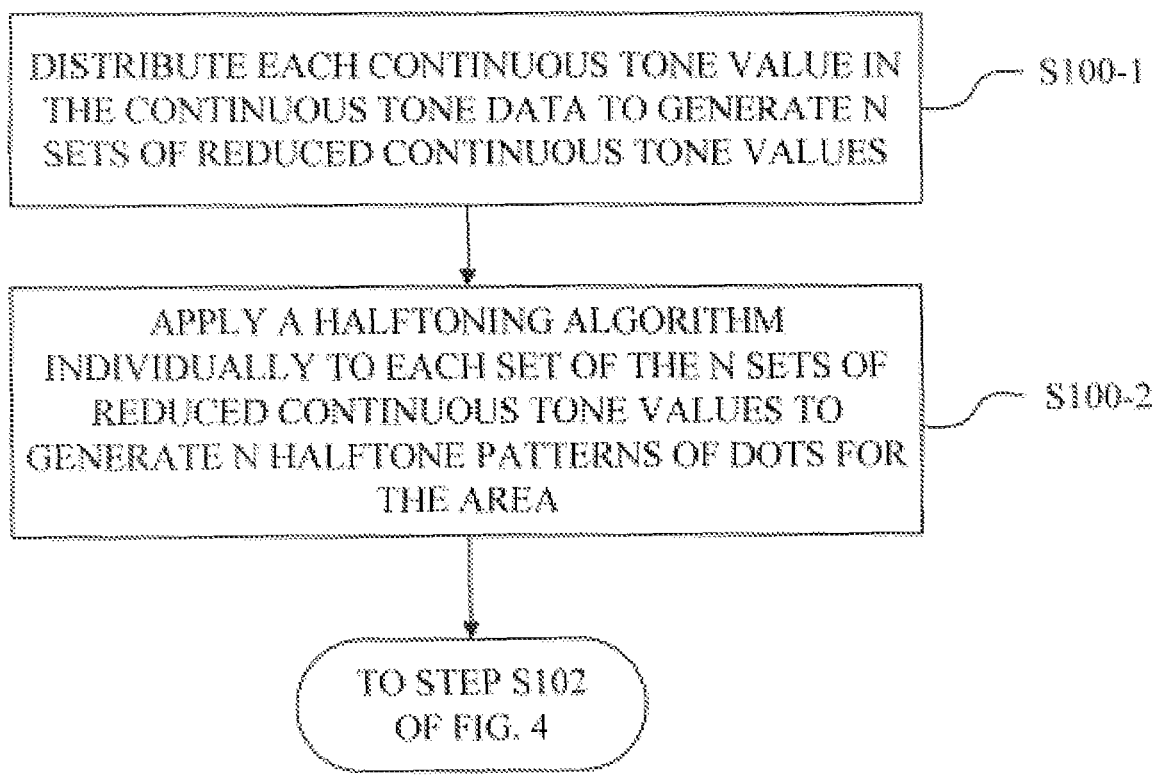
FIG. 6 is a flowchart of sub-steps corresponding to the general method of FIG. 4, in accordance with one embodiment of the present invention.

FIG. 6 is a flowchart of sub-steps corresponding to step S100 of the general method of FIG. 4, in accordance with one embodiment of the present invention.

At step S100-1, each continuous tone value in the continuous tone data supplied by color space conversion mechanism 54 to halftoner mechanism 56 is distributed, e.g., divided by N, to generate N sets of reduces continuous tone values. In the present embodiment, N corresponds to the number of the plurality of printing passes for printing the area, e.g., area 60. Since each continuous tone value represents the number of dots that will represent a sub-area of an image, e.g., area 60, the reduced continuous tone values for each of the N sets of reduced continuous tone values for that sub-area will be a fraction of 1/N of the dots of the corresponding continuous tone value prior to division.

For example, each continuous tone value in the continuous tone data may be a number V in a range of zero to 255. Each continuous tone value in the continuous tone data is represented in each of the N sets of continuous tone values by a value of V/N rounded to the nearest whole number, with any remainder being added to a corresponding V/N in one of the N sets. As a more specific example, assume a particular continuous tone value in the continuous tone data is 37 and N=4, then the corresponding value in the first set of the four (N=4) sets of continuous tone values is 9, the corresponding value in the second set of the four (N=4) sets of continuous tone value is 9, the corresponding value in the third set of the four (N=4)

sets of continuous tone values is 9, and the corresponding value in forth set of the four (N=4) sets of continuous tone values is 10. This process is repeated for each continuous tone value in the continuous tone data until all of the continuous tone data has been divided to form N=4 sets of continuous to be values.

At step S100-2, a halftoning algorithm is applied individually to each step of the N sets of reduced continuous tone values to generate N halftone patterns of dots for the area, e.g., area 60. Thus, continuing the example set forth in step S100-1, a halftoning algorithm, such as for example, error diffusion, is applied individually to each set of the N=4 sets of continuous tone value to generate N=4 halftone patterns of dots for the area to be printed.

The process then proceeds at step S102 of FIG. 4.

Figure 7:
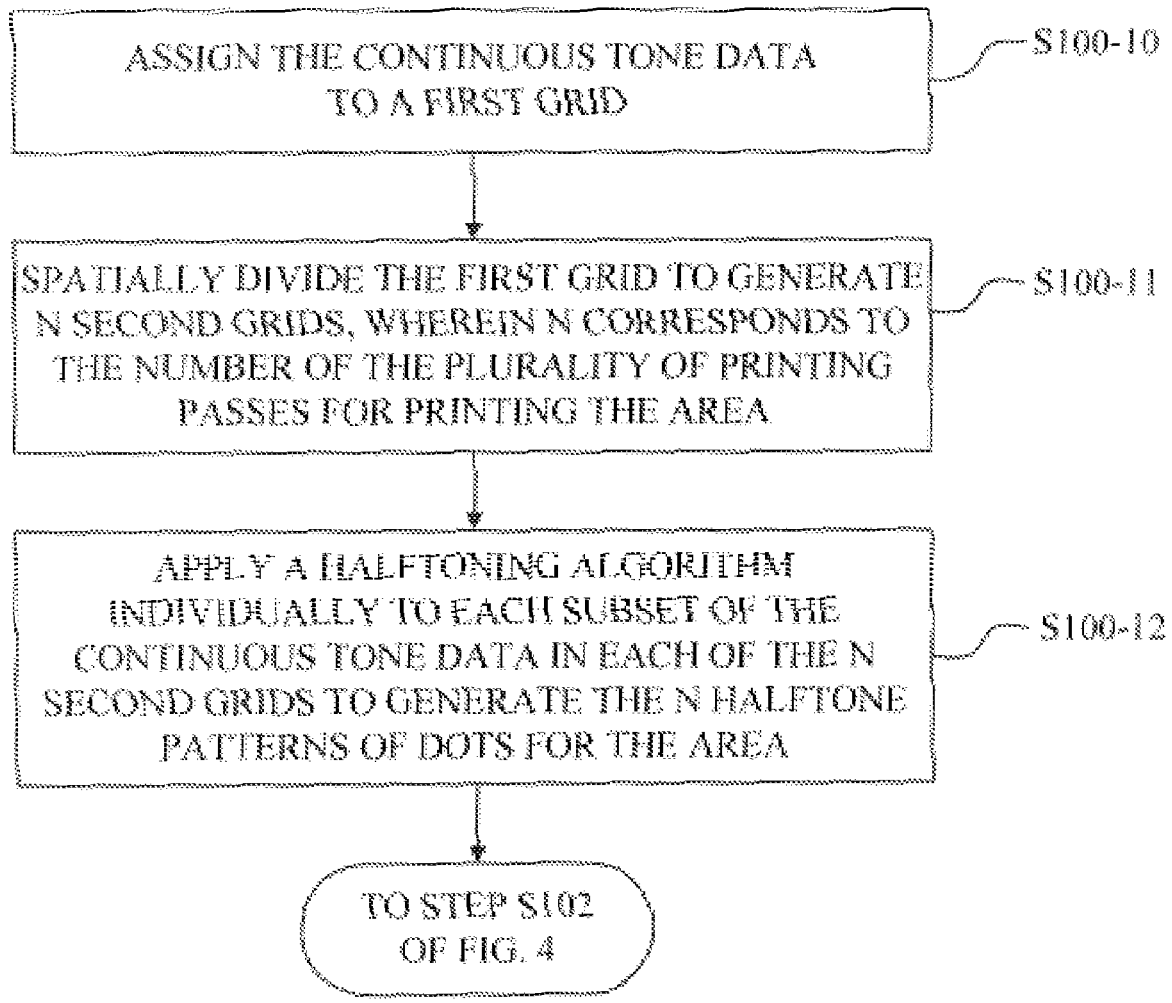
FIG. 7 is a flowchart of sub-steps corresponding to the general method of FIG. 4, in accordance with another embodiment of the present invention.

FIG. 7 is a flowchart of sub-steps corresponding to step S100 of the general method of FIG. 4, in accordance with another embodiment of the present invention.

At step S100-10, the continuous tone data is assigned to a first grid. The first grid defines pixel locations at a first resolution R, such as for example, 1200 rows×1200 columns of dots per inch, i.e., 1200×1200 dpi.

At step S100-11, the first grid is spatially divided, e.g., by N, to generate N second grids, wherein N correspond to the number of the plurality of printing passes for printing the area, e.g., area 60. Thus, each of the N second grid has a resolution of R/N and contains a subset of the continuous tone data. Thus, continuing the example started in step S100-10, assuming N=4, then the fast grid at a resolution of 1200×1200 dpi is divided into four second grids of 600×600 dpi each.

The division at step S100-11 may be achieved by forming various combinations of odd and even rows, and odd and even columns, of the first grid. For example, of the four second grids of 600×600 dpi each, the first 600×600 grid may be made up of the continuous tone data located at the intersection of the odd rows and the odd columns of the 1200×1200 grid, the second 600×600 grid may be made up of the continuous tone data located at the intersection of the odd rows and the even columns of the 1200×1200 grid, the third 600×600 grid may be made up of the continuous tone data located at the intersection of the even rows and the odd columns of the 1200×1200 grid, and the further 600×600 grid may be made up of the continuous tone data located at the intersection of the even rows and the even columns of the 1200×1200 grid.

At step S100-12, a halftoning algorithm is individually applied to each subset of the continuous tone data in each of the N second grids to generate the N halftone patterns of dots for the area, e.g., area 60. The halftoning algorithm may be, for example, an error diffusion halftone algorithm. Thus, continuing the example of steps S100-10 and S100-11, the error diffusion halftone algorithm is applied once to the continuous tone data located in each of the four 600×600 grids to generate the four (N=4) 600×600 halftone patterns of dots for the area.

Thus, in the present embodiment, at step S104 of FIG. 4, each of the low resolution 600×600 error diffusion halftone patterns of dots will be printed as a single pass of printhead 36 over the area, e.g., area 60.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of printing dots in an area on a page using a plurality of printing passes of a printhead over said area, comprising:
    processing continuous tone data representing an image through N halftoning iterations to generate N halftone patterns of dots for said area; and
    printing each individual halftone pattern of said N halftone patterns during said plurality of printing passes, with each individual halftone pattern of said N halftone patterns being printed on a different printing pass of said plurality of printing passes over said area,
    wherein said processing continuous tone data includes:
    distributing each continuous tone value in said continuous tone data to generate N sets of continuous tone values, wherein N corresponds to the number of said plurality of printing passes for printing said area; and
    applying a halftoning algorithm individually to each set of said N sets of continuous tone values to generate said N halftone patterns of dots for said area.

2. The method of claim 1, wherein said each continuous tone value in said continuous tone data is a number V in a range of zero to 255, and said each continuous tone value in said continuous tone data is represented in each of said N sets of continuous tone values by a value of V/N rounded to the nearest whole number, and with any remainder being added to a corresponding V/N in one of said N sets.

3. The method of claim 1, wherein said halftoning algorithm is an error diffusion halftone algorithm.

4. A method of printing dots in an area on a page using a plurality of printing passes of a printhead over said area, comprising:
    processing continuous tone data representing an image through N halftoning iterations to generate N halftone patterns of dots for said area; and
    printing each individual halftone pattern of said N halftone patterns during said plurality of printing passes, with each individual halftone pattern of said N halftone patterns being printed on a different printing pass of said plurality of printing passes over said area,
    wherein said processing continuous tone data includes:
    assigning said continuous tone data to a first grid, said first grid defining pixel locations at a first resolution R;
    spatially dividing said first grid to generate N second grids, wherein each of said N second grids contains a subset of said continuous tone data, and wherein N corresponds to the number of said plurality of printing passes for printing said area; and
    applying a halftoning algorithm individually to each subset of said continuous tone data in each of said N second grids to generate said N halftone patterns of dots for said area.

5. The method of claim 4, wherein said dividing is achieved by forming various combinations of odd and even rows, and odd and even columns, of said first grid.

6. The method of claim 4, wherein said halftoning algorithm is an error diffusion halftone algorithm.

7. An apparatus for printing dots in an area on a page using a plurality of printing passes of a printhead over said area, comprising:
    a print engine for carrying said printhead;
    a halftoner mechanism that receives continuous tone data representing an image and processes said continuous tone data through N halftoning iterations to generate N halftone patterns of dots for said area; and
    a formatter mechanism communicatively coupled between said halftoner mechanism and said print engine, said formatter mechanism being configured to supply each of said N halftone patterns individually to said print engine, with each individual halftone pattern of said N halftone patterns being printed on a different printing pass of said plurality of printing passes in said area, wherein the processing of said continuous tone data includes:

distributing each continuous tone value in said continuous tone data to generate N sets of continuous tone values, wherein N corresponds to the number of said plurality of printing passes for printing said area; and applying a halftoning algorithm individually to each set of said N sets of continuous tone values to generate said N halftone patterns of dots for said area.

8. The apparatus of claim 7, wherein said each continuous tone value in said continuous tone data is a number V in a range of zero to 255, and said each continuous tone value in said continuous tone data is represented in each of said N sets of continuous tone values by a value of V/N rounded to the nearest whole number, and with any remainder being added to a corresponding V/N in one of said N sets.

9. The apparatus of claim 7, wherein said halftoning algorithm is an error diffusion halftone algorithm.

10. An apparatus for printing dots in an area on a page using a plurality of printing passes of a printhead over said area, comprising:

a print engine for carrying said printhead;

a halftoner mechanism that receives continuous tone data representing an image and processes said continuous tone data through N halftoning iterations to generate N halftone patterns of dots for said area; and a formatter mechanism communicatively coupled between said halftoner mechanism and said print engine, said formatter mechanism being configured to supply each of said N halftone patterns individually to said print engine, with each individual halftone pattern of said N halftone patterns being printed on a different printing pass of said plurality of printing passes in said area, wherein the processing of said continuous tone data includes:

assigning said continuous tone data to a first grid, said first grid defining pixel locations at a first resolution R;

spatially dividing said first grid to generate N second grids, wherein each of said N second grids contains a subset of said continuous tone data, and wherein N corresponds to the number of said plurality of printing passes for printing said area; and applying a halftoning algorithm individually to each subset of said continuous tone data in each of said N second grids to generate said N halftone patterns of dots for said area.

11. The apparatus of claim 10, wherein said dividing is achieved by forming various combinations of odd and even rows, and odd and even columns, of said first grid.

12. The apparatus of claim 10, wherein said halftoning algorithm is an error diffusion halftone algorithm.

13. A method of printing dots in an area in a page using a plurality of printing passes of a printhead over said area, comprising:

processing continuous tone data representing an image through N halftoning iterations to generate N halftone patterns of dots for said area: and printing each individual halftone pattern of said N halftone patterns during said plurality of printing passes, with each individual halftone pattern of said N halftone patterns being printed on a different printing pass of said plurality of printing passes over said area, wherein said processing continuous tone data includes distributing each continuous tone value in said continuous tone data to generate N sets of continuous tone values, wherein N corresponds to the number of said plurality of printing passes for printing said area and applying a halftoning algorithm individually to each set of said N sets of continuous tone values to generate said N halftone patterns of dots for said area.

* * * * *